United States Patent
Kanda et al.

(10) Patent No.: US 8,738,090 B2
(45) Date of Patent: May 27, 2014

(54) MOBILE TERMINAL AND LOCK CONTROLLING METHOD

(71) Applicant: KYOCERA Corporation, Kyoto (JP)

(72) Inventors: Atsuhiko Kanda, Kyotanabe (JP); Hayato Takenouchi, Kizugawa (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 13/659,574

(22) Filed: Oct. 24, 2012

(65) Prior Publication Data

US 2013/0102281 A1    Apr. 25, 2013

(30) Foreign Application Priority Data

Oct. 25, 2011    (JP) .................................. 2011-233814

(51) Int. Cl.
*H04B 1/38*    (2006.01)

(52) U.S. Cl.
USPC .......................................... 455/566; 345/173

(58) Field of Classification Search
None
See application file for complete search history.

(56) References Cited

U.S. PATENT DOCUMENTS

| | | | |
|---|---|---|---|
| 8,203,530 B2 * | 6/2012 | Chiang | 345/157 |
| 2009/0241072 A1 * | 9/2009 | Chaudhri et al. | 715/863 |
| 2010/0159995 A1 * | 6/2010 | Stallings et al. | 455/566 |
| 2011/0130170 A1 * | 6/2011 | Han et al. | 455/566 |

FOREIGN PATENT DOCUMENTS

JP    H11-203045 A    7/1999

* cited by examiner

*Primary Examiner* — Magdi Elhag

(74) *Attorney, Agent, or Firm* — Procopio, Cory, Hargreaves & Savitch LLP

(57) ABSTRACT

A mobile phone includes a display, a touch panel provided on the display, etc., and can be set with a lock state. In a case that the lock state is set, a lock screen including a lock object is displayed on the display. Upon receipt of a mail, notification information of a newly-arrived mail is recorded in a notification table and the notification information of the newly-arrived mail is displayed in a notification area of the lock screen. If a user performs a sliding operation after touching the lock object, and then releases from the lock object within the notification area, the lock state is canceled, and a mail function is performed such that the above-described newly-arrived mail is displayed.

8 Claims, 11 Drawing Sheets

FIG. 3
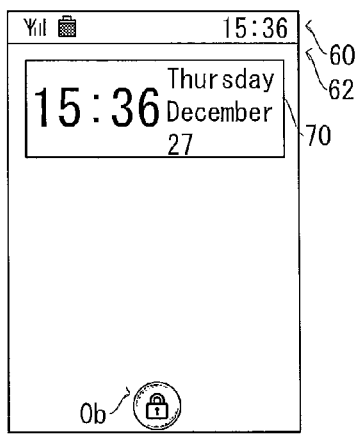
FIG. 4
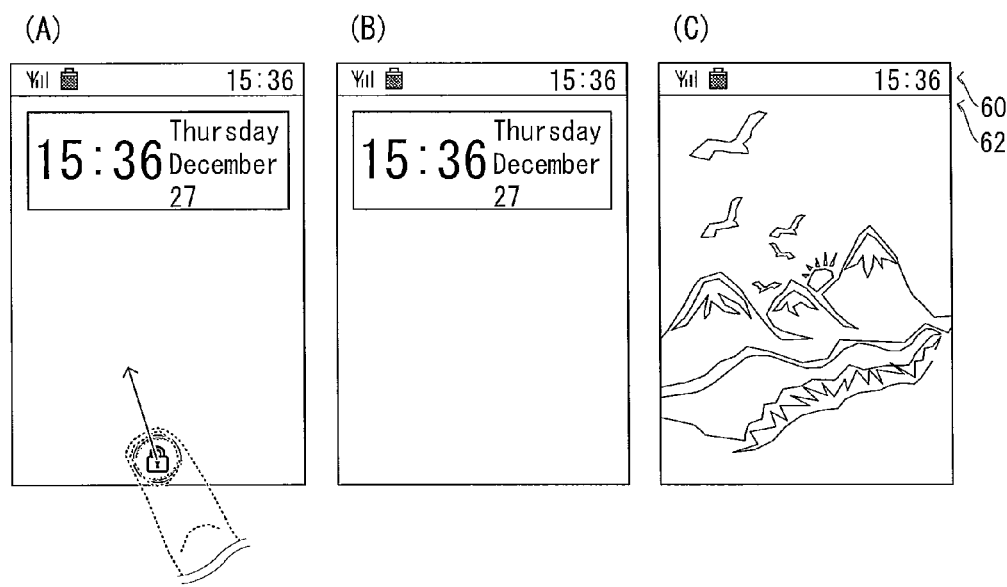
FIG. 5
NOTIFICATION TABLE
| TIME | FUNCTION | CONTENT | ADDITIONAL INFORMATION |
|---|---|---|---|
| 13:20 | TELEPHONE | Ms. +++ | 090332211** |
| 14:38 | TELEPHONE | Ms. +++ | 090332211** |
| 15:10 | MAIL | From :Mr.*** Subject:Hello! | Text: What would··· |
| ⋮ | ⋮ | ⋮ | ⋮ |

(A)      (B)

MOBILE TERMINAL AND LOCK CONTROLLING METHOD

CROSS REFERENCE OF RELATED APPLICATION

The disclosure of Japanese Patent Application No. 2011-233814 is incorporated herein by reference.

BACKGROUND OF THE INVENTION

1. Field of the Invention

The present invention relates to a mobile terminal and a lock controlling method, and more specifically a mobile terminal capable of being set with a lock state and a lock controlling method thereof.

2. Description of the Related Art

A mobile terminal in which a lock state can be set is known, and one example of such a kind of device is disclosed in Japanese Patent Application Laying-Open No. H11-203045 [G06F 3/033, G06F 3/00, H04Q 7/38, H04M 1/02, H04M 1/23] laid-open on Jul. 30, 1999. In a mobile terminal device in this related art, a gesture of a double-tapping operation or the like is registered for each operating scene. Then, at a time that an operation of a touch panel is being stopped, if a gesture corresponding to an operating scene is performed with respect to the touch panel, the touch panel returns to a normal operation form a stopped state.

However, in the mobile terminal device of the related art, if a plurality of operating scenes are to be registered, a user must memorize all of the plurality of operating scenes and gestures corresponding to the operating scenes. Then, when the user wishes to return the touch panel to a normal operation from a stopped state, if the user forgets a relationship between the gesture and the operating scene, it becomes impossible for the user to operate the mobile terminal device as he/she desires.

SUMMARY OF THE INVENTION

Therefore, it is a principal object of the present invention to provide a novel mobile terminal and lock controlling method.

Another object of the present invention is to provide a mobile terminal and lock controlling method, in that a user can easily performs a desired function through a touch operation.

The present invention employs following features in order to solve the above-described problems. It should be noted that reference numerals and the supplements inside the parentheses show one example of a corresponding relationship with the embodiments described later for easy understanding of the present invention, and do not limit the present invention.

A first aspect according to the present invention is a mobile terminal having a display portion, a touch panel provided on the display portion and a detecting portion which detects a touch operation to the touch panel, and capable of being set with a lock state restricting execution of predetermined processing based on a touch operation, comprising: a storing portion which stores notification information related to a predetermined function; a displaying processing portion which displays in a displaying area of the display portion, when the lock state is set, an object which accepts a touch operation for cancelling the lock state and moves in response to the touch operation, and the notification information; a determining portion which determines whether or not a touch operation that moves the object to a displaying domain where the notification information is being displayed, and then is released from the object is detected; a cancelling portion which cancels the lock state when it is determined said the touch operation is detected; and a performing portion which performs a function related to the notification information when it is determined that said touch operation is detected.

A second aspect according to the present invention is a lock controlling method of a mobile terminal having a display portion, a touch panel provided on the display portion, a detecting portion which detects a touch operation to the touch panel, and a storing portion which stores notification information related to a predetermined function, and capable of being set with a lock state restricting execution of predetermined processing based on a touch operation, comprising steps of: displaying in a displaying area of the display portion, when the lock state is set, an object which accepts a touch operation for cancelling the lock state and moves in response to the touch operation, and the notification information, determining whether or not a touch operation that moves the object to the displaying domain where the notification information is being displayed, and then is released from the object is detected; cancelling the lock state when it is determined that said touch operation is detected; and performing a function related to the notification information when it is determined that said touch operation is detected.

A third aspect according to the present invention is a mobile terminal having a display portion, a touch panel provided on the display portion and a detecting portion which detects a touch operation to the touch panel, and capable of being set with a lock state restricting execution of predetermined processing, comprising: a storing portion which stores notification information related to a predetermined function; a displaying processing portion which displays the notification information in a displaying area of the display portion when the lock state is set; a determining portion which determines whether or not a predetermined touch operation to a displaying domain where the notification information is being displayed; a cancelling portion which cancels the lock state when it is determined that said predetermined touch operation is detected; and a performing portion which performs a function related to the notification information when it is determined that said predetermined touch operation is detected.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 3 is an illustrative view showing one example of a lock screen displayed on a display shown in FIG. 1.

FIG. 4 are illustrative views showing one example of an operation when a lock state being set in the mobile phone shown in FIG. 1 is to be canceled, wherein FIG. 4(A) shows a direction of a touch operation performed to a lock object shown in FIG. 3, FIG. 4(B) is a displaying example of a state that the lock object is moved outside a screen, and FIG. 4(C) shows a displaying example of a standby screen.

FIG. 5 is an illustrative view showing one example of structure of a notification table stored in a RAM shown in FIG. 2.

FIG. 8 are illustrative views showing one example of an operation for changing the plurality of notification information shown in FIG. 7, wherein FIG. 8(A) shows a touch operation to be performed against a scroll bar shown in FIG. 7, and FIG. 8(B) shows a displaying example of other notification information.

FIG. 9 are illustrative views showing one example of an operation for displaying additional information in the notification information shown in FIG. 8(B), wherein FIG. 9(A) shows a touch operation against a lock object shown in FIG. 8(B), and FIG. 9(B) shows a touch operation against a displaying domain of the notification information shown in FIG. 8(B).

FIG. 10 are illustrative views showing one example of a screen transition at a time that a function corresponding to the notification information shown in FIG. 8(B) is performed, wherein FIG. 10(A) shows a state that the touch operation is released from a state shown in FIG. 9(B), and FIG. 10(B) shows a displaying example of a GUI for a mail function.

FIG. 14 are illustrative views showing another example of a lock screen including notification information and displaying examples at a time that a function corresponding to the notification information is performed, displayed on the display shown in FIG. 1, wherein FIG. 14(A) shows a displaying example of a lock screen including notification information of a first blog function, FIG. 14(B) is a displaying example showing additional information of the notification information shown in FIG. 14(A), and FIG. 14(C) is a displaying example of a GUI for the first blog function.

FIG. 15 are illustrative views showing of the other example of a lock screen including notification information and displaying examples at a time that a function corresponding to the notification information is performed, displayed on the display shown in FIG. 1, wherein FIG. 15(A) shows a displaying example of a lock screen including notification information of a second blog function, FIG. 15(B) is a displaying example showing additional information of notification information shown in FIG. 15(A), and FIG. 15(C) is a displaying example of a GUI for the second blog function.

FIG. 16 are illustrative views showing one example of an operation for changing notification information displayed on the display shown in FIG. 1 to secret displaying, wherein FIG. 16(A) shows a direction and a distance of a touch operation performed against a notification area shown in FIG. 8(B), FIG. 16(B) shows a state that a touch operation is performed in the direction and with the distance shown in FIG. 16(A), and FIG. 16(C) shows a state that the notification information shown in FIG. 16(A) is changed to the secret displaying.

FIG. 18 are illustrative views showing one example of an operation for displaying notification information displayed on the display shown in FIG. 1 by category, wherein FIG. 18(A) shows one example of a lock screen that a category icon is displayed, FIG. 18(B) shows a state that a touch operation is being performed to the category icon shown in FIG. 18(A), and FIG. 18(C) shows a displaying example of a plurality of notification information classified by category.

FIG. 20 are illustrative views showing a further example of a lock screen including notification information and displaying examples at a time that a function corresponding to the notification information is performed, displayed on the display shown in FIG. 1, wherein FIG. 20(A) shows a lock screen including a task icon, FIG. 20(B) shows a state that a touch operation is being performed to the task icon shown in FIG. 20(A), and FIG. 20(C) shows another displaying example of a GUI of a mail function.

DETAILED DESCRIPTION OF THE PREFERRED EMBODIMENTS

<First Embodiment>

Figure 1:
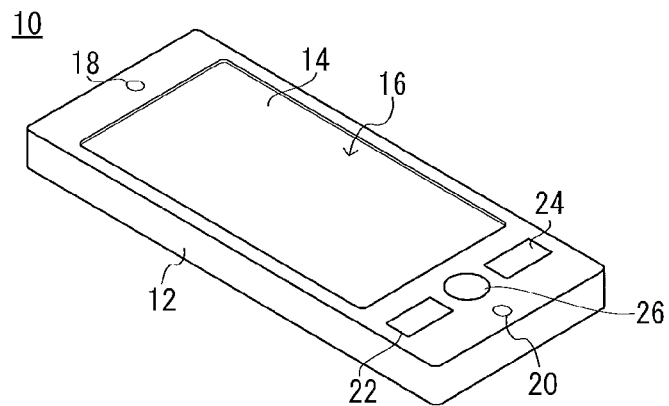
FIG. 1 is an appearance view showing a mobile phone of one embodiment according to the present invention.

With referring to FIG. 1, a mobile phone 10 of one embodiment according to the present invention is a smartphone as one example, and includes a longitudinal flat rectangular housing 12. However, it is pointed in advance that the present invention can be applied to an arbitrary mobile terminal such as a tablet terminal, a PDA, etc.

A display 14 such as a liquid crystal, organic EL or the like is provided on a main surface (front surface) of the housing 12. A touch panel 16 is provided on the display 14. Therefore, in the mobile phone 10 of this embodiment shown, the most of input operations except an operation through a hard key described later are performed through the touch panel 16.

A speaker 18 is housed in the housing 12 at a side of the front surface at one end of a longitudinal direction, and a microphone 20 is housed at a side of the front surface at the other end in the longitudinal direction.

As a hard key constituting an inputting portion together with the touch panel 16, in this embodiment, a call key 22, an end key 24 and a menu key 26 are provided.

For example, the user can input a telephone number by making a touch operation on the touch panel 16 with respect to a dial key (not shown) displayed on the display 14, and start a telephone conversation by operating the call key 22. If and when the end key 24 is operated, the telephone conversation can be ended. In addition, by long-depressing the end key 24, it is possible to turn-on/-off a power of the mobile phone 10.

If the menu key 26 is operated, a menu screen is displayed on the display 14, and in such a state, by making a touch operation on the touch panel 16 against a soft key, a menu icon (both, not shown) or the like being displayed on the display 14, it is possible to select a menu, and to decide such a selection.

Figure 2:
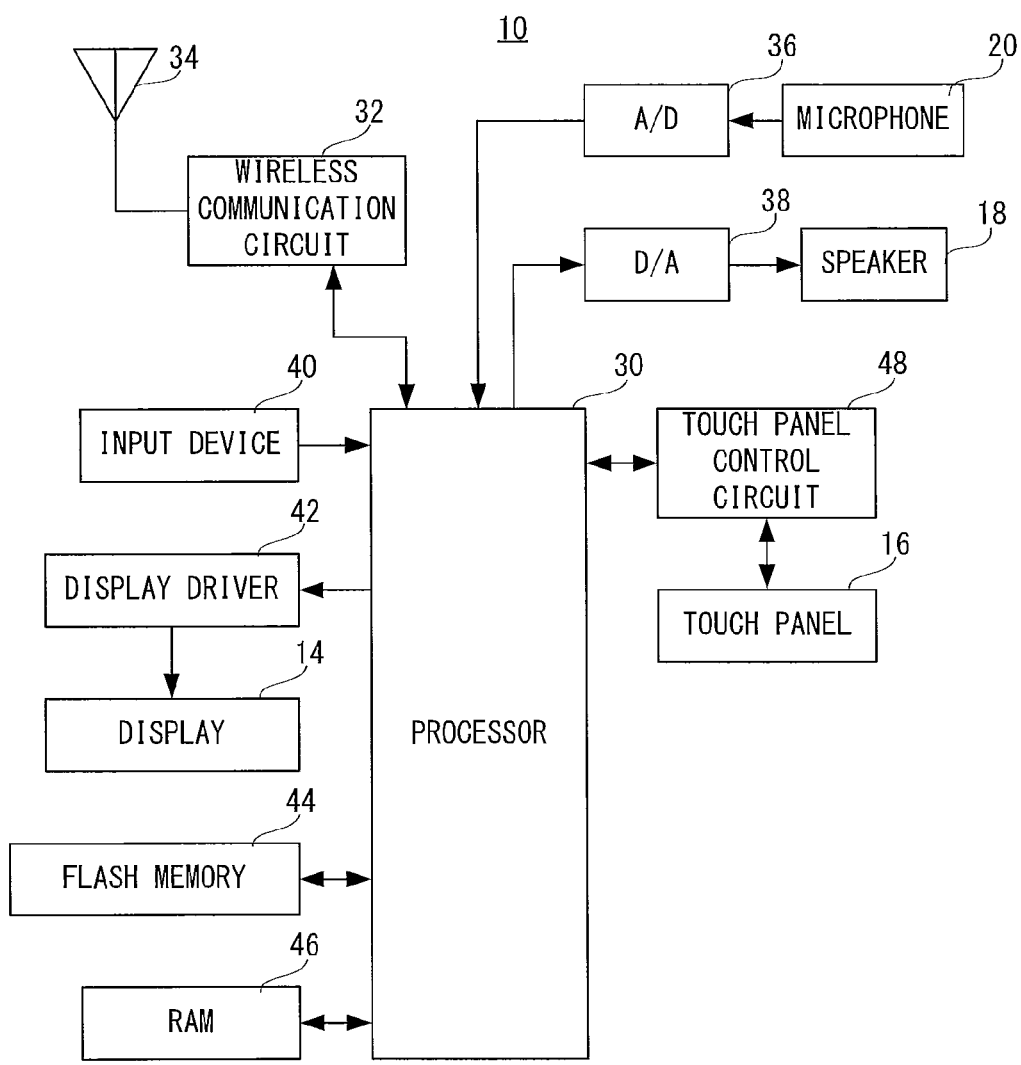
FIG. 2 is an illustrative view showing electrical structure of the mobile phone shown in FIG. 1.

With referring to FIG. 2, the mobile phone 10 of the embodiment shown in FIG. 1 includes a processor 30 called as a computer or a CPU. The processor 30 is connected with a wireless communication circuit 32, an A/D converter 36, a D/A converter 38, an input device 40, a display driver 42, a flash memory 44, a RAM 46, a touch panel control circuit 48, etc.

The processor 30 is in charge of a whole control of the mobile phone 10. All or a part of a program set in advance on the flash memory 44 is, in use, developed into the RAM 44, and the processor 30 operates in accordance with the program in the RAM 44. In addition, the RAM 44 is further used as a working area or buffer area for the processor 30.

The input device 40 includes the touch panel 16 shown in FIG. 1, the hard keys 22. 24 and 26, and constitutes an operating portion or an inputting portion. Information (key data) of the hard key operated by the user is input to the processor 30.

The wireless communication circuit 32 is a circuit for transmitting and receiving a radio wave for a telephone conversation and a mail via an antenna 34. In this embodiment, the wireless communication circuit 32 is a circuit for performing a wireless communication with a CDMA system. For example, if the user designates a telephone dispatch (telephone call) using the input device 40, the wireless communication circuit 32 performs a telephone call processing under instructions from the processor 30 and outputs a telephone call signal via the antenna 34. The telephone call signal is transmitted to a telephone at the other end of the line through a base station and a communication network. Then, an incoming processing is performed in the telephone at the other end of the line, a communication-capable state is established and the processor 30 performs the telephonic communication processing.

Specifically describing, a normal telephonic communication processing, a modulated sound signal sent from a telephone at the other end of the line is received by the antenna 34. The modulated sound signal received is subjected to a demodulation processing and a decode processing by the wireless communication circuit 32. A received sound signal obtained through such processing is converted into an analog sound signal by the D/A converter 38 to be output from the speaker 18. On the other hand, a sending sound signal taken-in through the microphone 20 is converted into sound data by the A/D converter 36 to be applied to the processor 30. The sound data is subjected to an encode processing and a modulation processing by the wireless communication circuit 32 under instructions by the processor 30 to be output via the antenna 34. Therefore, the modulated sound signal is transmitted to the telephone at the other end of the line via the base station and the communication network.

When the telephone call signal from a telephone at the other end of the line is received by the antenna 34, the wireless communication circuit 32 notifies the processor 30 of the incoming call. In response thereto, the processor 30 displays on the display 14 sender information (telephone number and so on) described in the incoming call notification by controlling the display driver 42. In addition, the processor 30 outputs from the speaker 18 a ringtone (may be also called as a ringtone melody, a ringtone voice).

Then, if the user performs a responding operation by using the call key 22 (FIG. 1), the wireless communication circuit 32 performs a processing for establishing a communication-capable state under instructions by the processor 30. Furthermore, when the communication-capable state is established, the processor 30 performs the above-described normal telephone communication processing.

If the telephone communication ending operation is performed by the end key 24 (FIG. 1) included in the input device 40 after a state is changed to the communication-capable state, the processor 30 transmits a telephone communication ending signal to the telephone at the other end of the line by controlling the wireless communication circuit 32. Then, after the transmission of the telephone communication ending signal, the processor 30 terminates the telephone communication processing. Furthermore, in a case that the telephone ending signal from the telephone at the other end of the line is previously received, the processor 30 also terminates the telephone communication processing. In addition, in a case that the telephone communication ending signal is received from the mobile communication network not from the telephone at the other end of the line, the processor 30 also terminates the telephone communication processing.

The microphone 20 shown in FIG. 1 is connected to the A/D converter 36, and as described above, a sound signal from the microphone 20 is input to the processor 30 as digital sound signal through the A/D converter 36. The speaker 18 is connected to the D/A converter 38. The D/A converter 38 converts a digital sound signal into an analog sound signal so as to apply to the speaker 18 via an amplifier. Therefore, a sound or voice of the sound data is output from the speaker 18.

In addition, the processor 30 adjusts, in response to an operation of a volume by the user, a sound volume of the sound output from the speaker 18 by controlling an amplification factor of the amplifier connected to the D/A converter 38.

The display driver 42 is connected with the display 14 shown in FIG. 1, and therefore, the display 14 displays an image or video in accordance with image or video data output from the processor 30. That is, the display driver 40 controls a displaying by the display 14 which is connected to the display driver 40 under instructions by the processor 30. In addition, the display driver 42 includes a video memory which temporarily stores the image or video data to be displayed. The display 14 is provided with a backlight which includes a light source of an LED or the like, for example, and the display driver 42 controls, according to the instructions of the processor 30, brightness, light-on/off of the backlight.

The touch panel 16 shown in FIG. 1 is connected to the touch panel control circuit 48. The touch panel control circuit 48 applies a necessary voltage, etc. to the touch panel 16, and inputs to the processor 30 a touch start signal indicating a start of a touch by the user, a touch end signal indicating an end of a touch by the user, and coordinates data indicating a touch position that the user touches. Therefore, the processor 30 can determine which icon or key is touched by the user based on the coordinates data.

In the embodiment, the touch panel 16 is of an electrostatic capacitance system that detects a change of an electrostatic capacitance between electrodes, which occurs when an object such as a finger is in close to a surface of the touch panel 16, and it is detected that one or more fingers is brought into contact with the touch panel 16, for example. In addition, the touch panel 16 is a pointing device which is provided on the display 14 and designates an arbitrary position within a screen of the display. The touch panel control circuit 48 functions as a touch detecting portion, and detects a touch operation within a touch-effective range of the touch panel 16, and outputs coordinates data indicative of a position of the touch operation to the processor 30. That is, the user can input an operating position, an operating direction and so on to the mobile phone 10 by touching, sliding and releasing on or from the surface of the touch panel 16.

In addition, for a detection system of the touch panel 16, a surface-type electrostatic capacitance system may be adopted, or a resistance film system, an ultrasonic system, an infrared ray system, an electromagnetic induction system or the like may be adopted. Furthermore, a touch operation is not limited to an operation by a finger, may be performed by a touch pen.

Furthermore, although a detailed description will be omitted here, the mobile phone 10 includes, in its telephone function, an answering machine function performing automatic answering and recording a message of a person making a telephone call in a case that a predetermined time elapses while no response occurs to the telephone call. Furthermore, the mobile phone 10 can perform a mail function through a communication with a network.

In addition, the above-described wireless communication circuit 32, A/D converter 34 and D/A converter 36 may be included in the processor 30.

The mobile phone 10 is provided with a lock function making the above-described function or the like not to be performed through a touch operation. For example, if the end key 24 is operated, a power for the display 14 and the touch panel 16 is turned-off and a lock state is set. Thereafter, if the end key 24 is operated, the power of the display 14 and the touch panel 16 is turned-on, and a lock screen shown in FIG. 3 is displayed so as to accept a cancelling operation of the lock state.

In addition, in the lock state of this embodiment shown, the power for the display 14 and the touch panel 16 is turned-off until the lock screen becomes to be displayed, and therefore, electrical power consumption of the mobile phone 10 can be suppressed. However, in other embodiments, the power of the touch panel 16 may not be turned-off, and a touch operation is made invalid by disregarding an input touch operation by the processor 30.

With referring to FIG. 3, a displaying range of the display 14 for displaying a lock screen includes a status displaying area 60 and a function displaying area 62. In the status displaying area 60, an icon (picto) showing a radio wave reception state by the antenna 34, an icon showing a residual battery capacity of a secondary battery and a time are displayed. In the function displaying area 62, a current date and time 70 is displayed and a lock object Ob is displayed at a lower center. Then, a displaying position of the lock object Ob is changed in accordance with a position of a finger of the user, i.e. a current touch position.

Here, if a predetermined touch operation is performed with respect to the lock object Ob, the lock state is canceled.

For example, with referring to FIG. 4(A), the finger is slidden such that a moving distance of the lock object Ob becomes equal to or longer than a predetermined distance, and then, the finger is released from the lock object Ob, as shown in FIG. 4(B), displaying of the lock object Ob disappears. Then, if the displaying of the lock object Ob disappears, in the function displaying area 62 of the display 14, a standby screen shown in FIG. 4(C) becomes to be displayed. Furthermore, the lock state can be also canceled in a case that a touch operation (flick) that the lock object Ob is flicked with the finger at a predetermined speed or more. Thus, in this embodiment shown, in order to make the user operate the lock object Ob by one hand, the lock object Ob is displayed at a lower center of a screen. Therefore, it is possible for the user to easily perform a cancelling operation of the lock state by one hand. Furthermore, a direction of a touch operation for cancelling the lock state with respect to the lock object Ob is not restricted, and therefore, a cancelling operation can be easily performed with either one of both hands.

In addition, if the moving distance of the lock object Ob is less than the predetermined distance, or a speed of the flick is slow, the lock state is not canceled, and the lock Icon Ob returns to its home position.

FIG. 5 is an illustrative view showing one example of structure of a notification table. The notification table is a table in which notification information for being notified to the user is recorded. At a time that an unattended call (missed call) occurs, or a time that a voice is recorded by an automatic answering machine function, or a newly-arrived mail is received by a mail function, notification information is recorded in the notification table with a time that the notification information occurs and a content thereof.

With referring to FIG. 5, the notification table includes "time column" wherein a time that the notification information occurs is recorded, "function column" wherein a function corresponding to the notification information is recorded, "content column" wherein a content of the notification information is recorded and "additional information column" wherein additional information of the notification information is recorded. Then, each row of the notification table corresponds to one notification information.

For example, notification information occurring at thirteen o'clock twenty minutes (13:20) and fourteen o'clock thirty-eight minutes (14:38) shows that a telephone call from "Ms. +++" has not been responded (unattended telephone call or missed call) and as the additional information, a telephone number of "Ms. +++" is recorded. Furthermore, notification information occurring at fifteen o'clock ten minutes (15:10) indicates that a mail (subject "Hello") from "Mr. ***" who is a sender is received, and a part ("What would - - - ") of a text or body of the mail is recorded as the additional information.

In addition, if the voice of a telephone-calling person is recorded by the automatic answering machine function, a recording time and so on are recorded in the notification table as notification information, and as additional information, a telephone number of the person is recorded.

Figure 6:
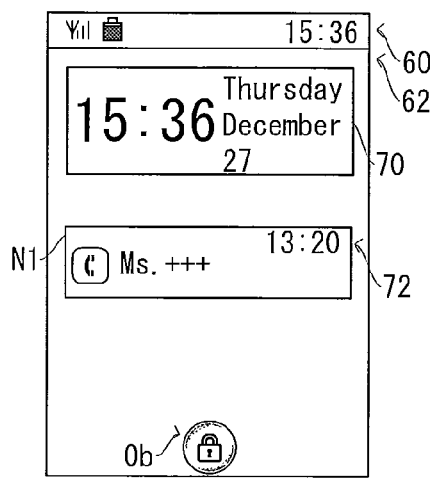
FIG. 6 is an illustrative view showing one example of a lock screen including notification information and being displayed on the display shown in FIG. 1.

Here, in a case that the lock state is set, notification information recorded in the notification table is displayed in the lock screen. With referring to FIG. 6, the function displaying area 62 is formed with a notification area 72 which displays the notification information. If and when one piece of notification information is recorded in the notification table, the notification information N1 corresponding to this notification information is displayed in the notification area 72. Furthermore, with referring to FIG. 7, in a case that at least three (3) pieces of notification information are recorded in the notification table, in the notification area 72, two (2) pieces of notification information N1 and N2 being old in a recording sequence and a scroll region SC including a scroll bar B are displayed. Then, in the each notification information N, an icon corresponding to the notification information, a time that the notification information occurs, and a content of the notification information are included. In addition, the additional information is not displayed at this time.

Figure 7:
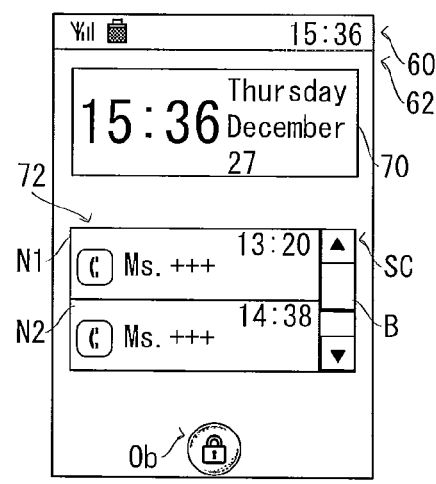
FIG. 7 is an illustrative view showing one example of a lock screen including a plurality of notification information and being displayed on the display shown in FIG. 1.

Furthermore, as shown in FIG. 7, in the embodiment shown, a maximum number of the notification information capable of being displayed in the notification area 72 is two (2), and therefore, the scroll region SC displayed in the notification area 72 shows that the notification information N3 having not been displayed at a current time exists.

Figure 8:
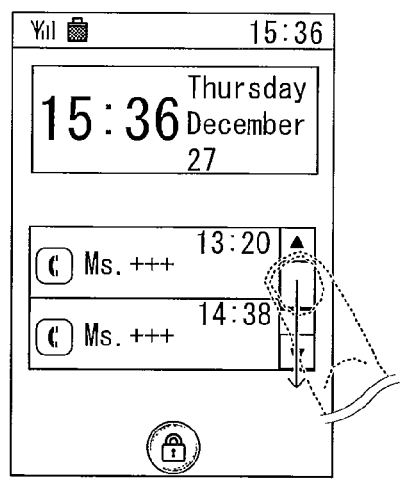
Figure 8:
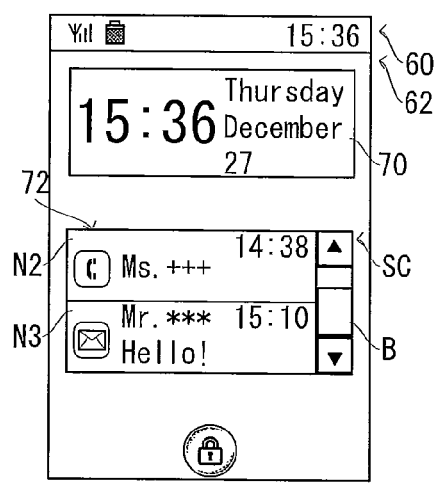

With referring to FIG. 8(A) and FIG. 8(B), if a touch operation that the scroll bar B is moved downwardly is performed, the notification information N to be displayed in the notification area 72 is renewed. In this example, the notification information N1 becomes not to be displayed, and instead thereof, the notification information N3 becomes to be displayed. In addition, a displaying position of the notification information N2 is moved to a position that the notification information N1 was displayed. Thus, even in the lock state, a touch operation (scroll operation) for renewing the displaying of the notification information can be accepted. Therefore, the user is able to confirm respective notification information N without cancelling the lock state even if a plurality of notification information N are recorded.

In addition, in other embodiment, in a case that a touch operation for moving in up and down direction within the notification area 72, as similar to a case that the scroll bar B is operated, the notification information N to be displayed in the notification area 72 is renewed.

Furthermore, the notification information N of the mail function in other embodiments, only either one of a reception time or a sender name may be included.

Figure 9:
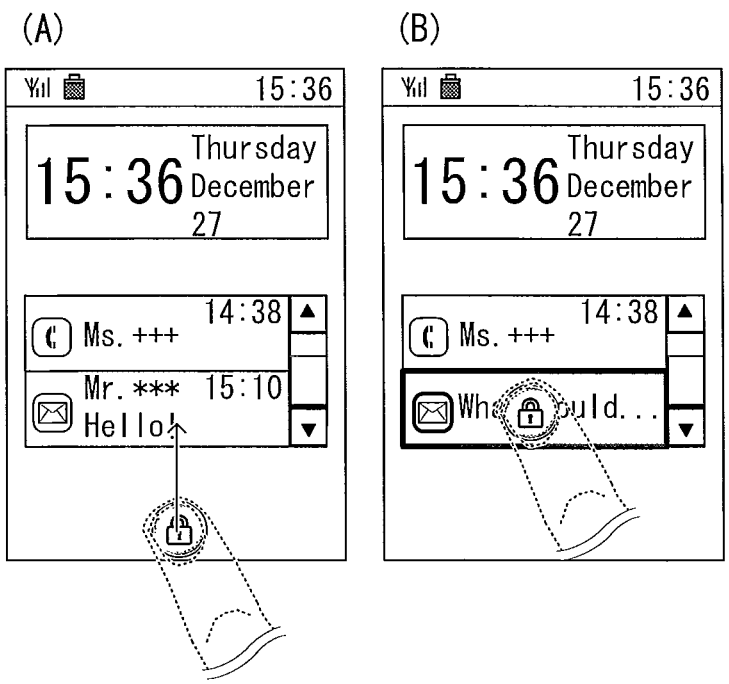

With referring to FIG. 9(A) and FIG. 9(B), if the finger is moved within a displaying domain of arbitrary notification information N within the notification area 72 while staying in touch to the lock object Ob, and a predetermined time (three (3) seconds, for example) elapses, additional information is displayed. For example, a touch position is moved to the notification information N3 corresponding to a newly-arrived mail, the additional information (a part of a text or body of the newly-arrived mail) being recorded in the notification table is read, and the additional information becomes to be displayed in the notification area 72 instead of the notification information N3. Furthermore, if the additional information is displayed, lines forming a frame, icons, etc. is made thicker. Thus, the user can confirm a detailed content of the notification information N while the lock state is not canceled. In addition, if and when the additional information is to be displayed, characters, GUI, etc. may be displayed with being enlarged.

In FIG. 9(B), if a moving destination of the lock object Ob in the notification area 72 is within a displaying domain of the notification information N3, the displaying of the additional information is not changed, but if being in a displaying domain of the notification information N2, the additional information of the notification information N2 becomes to be displayed. If the lock object Ob is out of the notification area 72, the displaying of the additional information is disappeared, and the notification information N previously displayed becomes to be displayed.

Here, in this embodiment shown, if the finger is released from the lock object Ob in a state that the lock object Ob is moved within the displaying domain of the notification information N, the lock state is canceled and a function according to the notification information N is performed.

Figure 10:
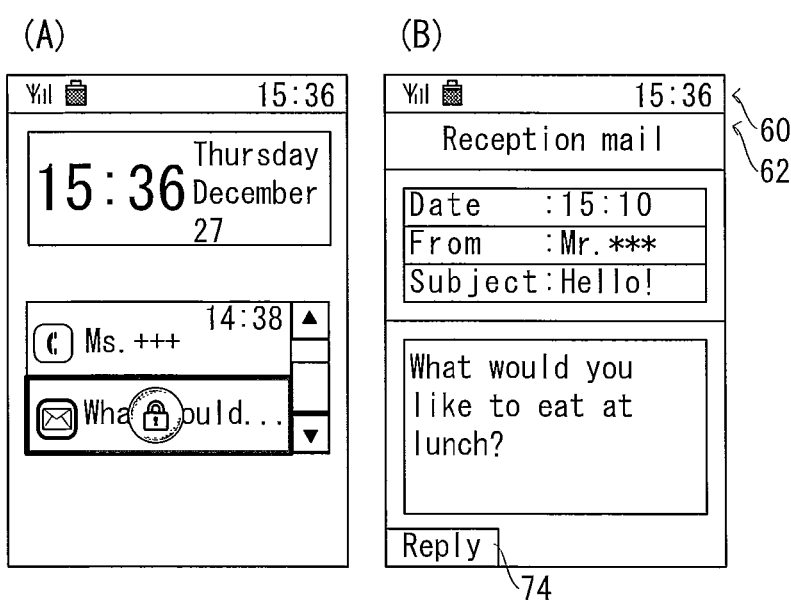

With referring to FIG. 10(A) and FIG. 10(B), the notification information N3 is notification information notifying of a newly-arrived mail, and if the finger is released within the displaying domain that the notification information N3 is being displayed, the newly-arrived mail corresponding to the notification information N3 is displayed on the display 14. That is, in the function displaying area 62 of the display 14, details of the received mail are displayed, and a reply key 74 for returning a mail to the newly-arrived mail (received mail) is displayed in a lower left. Then, the user can send a reply mail to the received mail being displayed as necessary.

Thus, when the user confirms the notification information N displayed in the lock screen, if necessary, the user can cancel the lock state and perform a function corresponding to the notification information N. Especially, it is possible for the user to determine whether or not the lock state is to be canceled and the function corresponding to the notification information N is to be performed after confirmation of the details of the notification information N by the additional information.

Furthermore, in a case that after the lock object Ob is touched, the touch position is included in the displaying domain of the notification information N2 for the unattended (missed) telephone call, the telephone number of a person who sends the telephone call is displayed as the additional information. Then, if the finger released from the lock object Ob, the lock state is canceled, and therefore, a telephone function is performed such that a telephone call is to be made to the telephone number of the additional information. That is, it becomes possible for the user to respond to the unattended telephone call without an operation for cancelling the lock state.

Furthermore, in a case that the notification information N by the automatic answering machine function is displayed on the display 14, in the displaying domain of the notification information N, a time that the voice is recorded, a name of a calling person, etc. are included. Then, if after the lock object Ob is touched, the touch position is included in the displaying domain of the notification information N for the automatic answering machine function, the telephone number of the calling person is displayed as the additional information, and upon releasing of the touch operation, the automatic answering machine function is performed in a state that the recorded voice can be reproduced. That is, it becomes possible to confirm the recorded voice by omitting an operation that the lock state is canceled.

In the above, features of the embodiments were summarized, in the following, with using a memory map shown in FIG. 11 and flowcharts shown in FIG. 12 and FIG. 13, the features will be described in detail.

Figure 11:
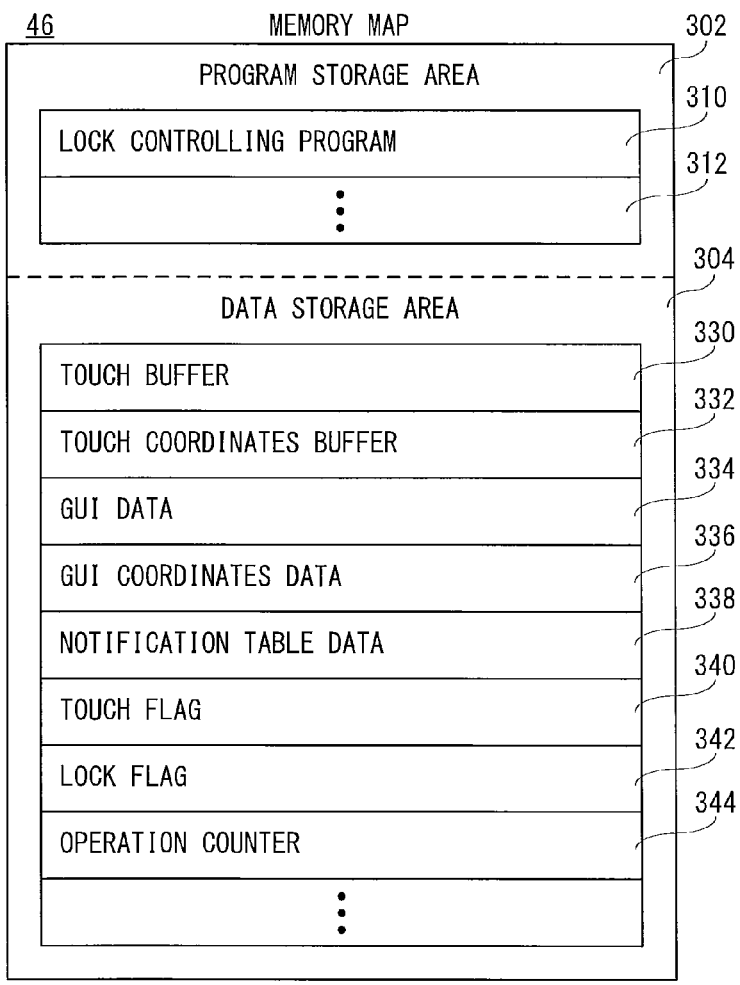
FIG. 11 is an illustrative view showing one example of a memory map of the RAM shown in FIG. 2.

With referring to FIG. 11, in a RAM 46 shown in FIG. 2, a program storage area 302 and data storage area 304 are formed. The program storage area 302 is an area for storing (developing) a part of or all program data set in advance in the flash memory 44 (FIG. 2) by reading out, as aforementioned.

The program storage area 302 includes a lock controlling program 310 for cancelling a lock state, or for cancelling a lock state and performing a function, etc. In addition, in the program storage area 302, programs for performing a telephone function, an automatic answering machine function and a mail function, etc. are included.

Next, in the data storage area 304 of the RAM 46, a touch buffer 330 is formed, and the touch coordinates map data 332, GUI data 334, GUI coordinates data 336, notification table data 338 are stored. In addition, in the data storage area 304, a touch flag 340, a lock flag 342 and an operation counter 344 are also provided.

The touch buffer 330 is stored with data of the touch coordinates output by the touch panel control circuit 48. The touch coordinates map data 332 is data for mapping the touch coordinates by the touch operation and the displaying coordinates on the display 14 with each other. That is, based on the touch coordinates map data 332, a result of the touch operation performed to the touch panel 16 is reflected in the displaying of the display 14.

The GUI data 334 is data for displaying a GUI of images, character strings, etc. for displaying the lock object Ob, the scroll bar B, the notification information N. The GUI coordinates data 336 is data indicative of a coordinates position that the above-described GUI is being displayed. The notification table data 338 is data that a function and so on corresponding to the notification information are stored in relation to the notification information as shown in FIG. 5.

The touch flag 340 is a flag for determining whether or not a touch to the touch panel 16 is performed. For example, the touch flag 340 is constituted by one-bit register. If the touch flag 340 is turned-on (truth), the register is set with a data value "1". On the other hand, if the touch flag 340 is turned-off (failure), a data value "0" is set in the register. In addition, the touch flag 340 is changed on/off based on a signal output by the touch panel control circuit 48.

The lock flag 342 is a flag showing whether or not a lock state is set. For example, the lock flag 342 is turned-on in response to the processing turning the power for the display 14 and the touch panel 16 off. Furthermore, the lock flag 342 is also turned-off in response to the processing of the above-described lock controlling program 310. Then, structure of the lock flag 342 is approximately same as that of the touch flag 340, and therefore, a detailed description thereof is omitted here.

The operation counter 344 is a counter for measuring a time of the touch operation. The operation counter 344 is started to count (measure) a time when the touch position enters the notification area 72 in a state staying in touch. Therefore, the operation counter 344 may be called as an operation timer.

In addition, the data storage area 304 is stored with image data and data of character strings being displayed in the standby state, and formed with a counter and a flag necessary for an operation of the mobile phone 10.

Figure 12:
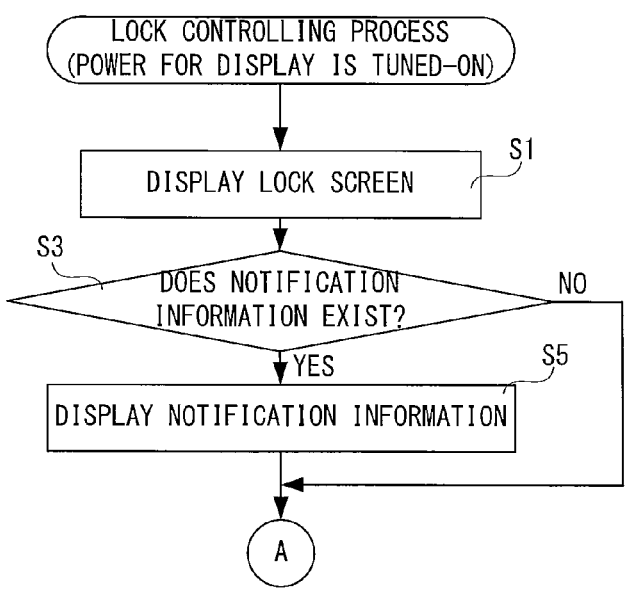
FIG. 12 is a flowchart showing one example of a part of a lock controlling process by a processor shown in FIG. 2.
Figure 13:
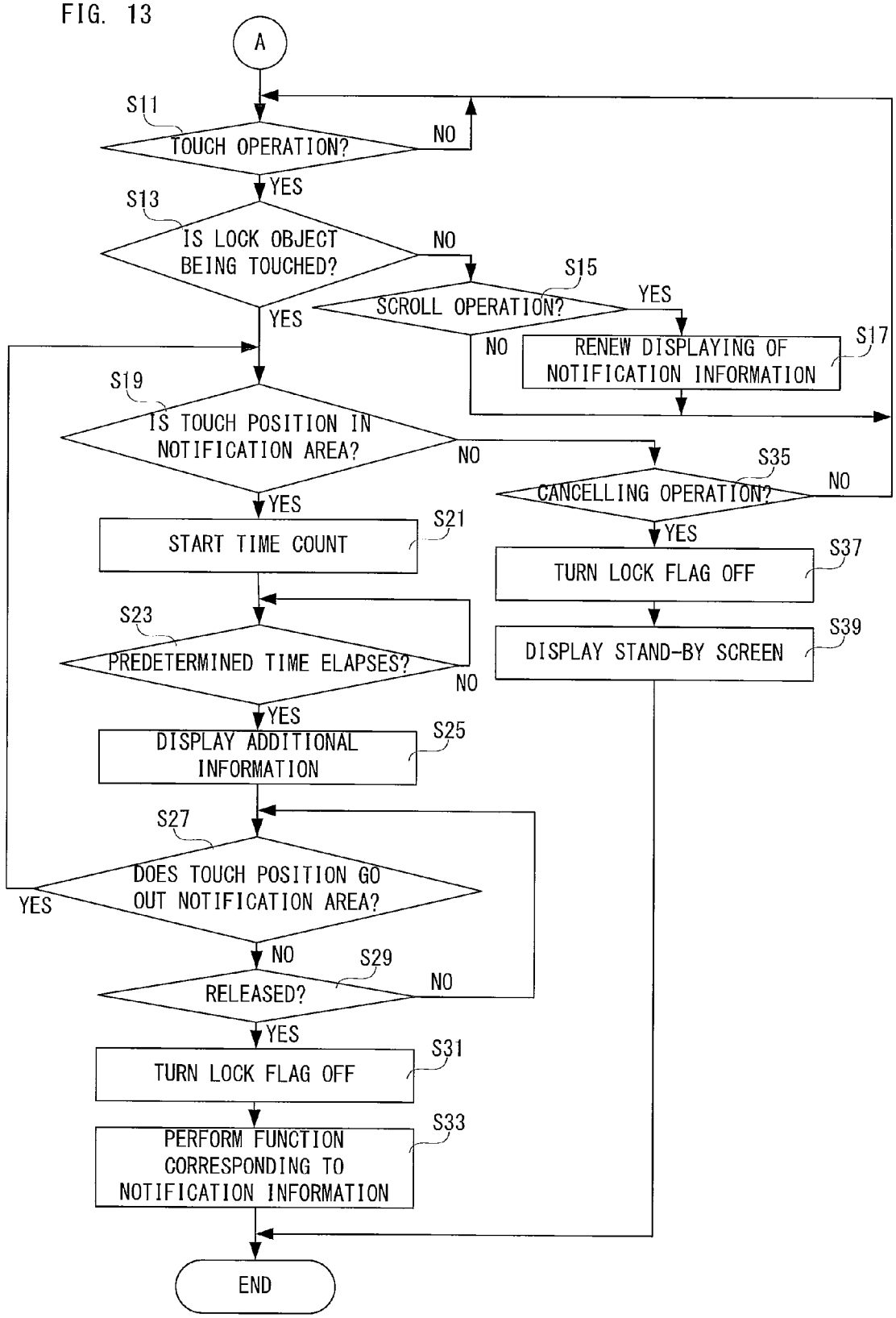
FIG. 13 is a flowchart showing one example of another part of the lock controlling process by the processor shown in FIG. 2, following FIG. 12.

The processor 30 processes a plurality of tasks including the lock controlling process shown in FIG. 12 and FIG. 13 and so on in parallel with each other under controls by Linux (registered trademark)-base OS such as Android (registered trademark) and REX or other OSs.

The lock controlling process is started at a time that the power for the display 14 is turned-on in a state that the lock state being set (the lock flag 340 is turned-on).

In a step S1, the processor 30 fetches information of date and time from an RTC, and reads-out image data of the lock object Ob included in the GUI data 334 so as to display the lock screen as shown in FIG. 3 in the function displaying area 62 of the display 14.

Subsequently, in a step S3, the processor 30 determines whether or not there is notification information. That is, it is determined whether or not the notification information is recorded in the notification table data 338. If "NO" is determined in the step S3, that is, if no notification information is recorded in the notification table data 338, the process proceeds to a step S11. On the other hand, if "YES" is determined in the step S3, that is, if the notification information is recorded in the notification table as shown in FIG. 5, for example, in a step S5, the processor 30 displays the notification information. In addition, the processor 30 executing the processing of the step S5 functions as a displaying processing portion.

Subsequently, in the step S11 in FIG. 13, it is determined whether or not a touch operation is performed. That is, it is determined whether or not the touch flag 340 is tuned-on and whether or not the touch coordinates stored in the touch buffer 330 is renewed. If "NO" is determined in the step S11, if a touch operation is not performed, for example, the processing of the step S11 is repeated. If "YES" is determined in the step S11, that is, if the touch operation is made, in a step S13, the processor 30 determines whether or not the lock object Ob is touched. More specifically, the processor 30 reads the coordinates range of the lock object Ob from the GUI coordinates data 336, and determines whether or not the touch coordinates indicating the current touch position stored in the touch buffer 330 is included in the coordinates range.

If "NO" is determined in the step S13, that is, if the touch operation is not to the lock object Ob, in a step S15, the processor 30 determines whether or not a scroll operation is made. More specifically, it is determined whether or not the touch operation sliding in a scrolling direction (up and down direction, in this embodiment shown) is performed in a state that the touch coordinates representing the current touch position stored in the touch buffer 330 is included in the coordinates range of the scroll bar B included in the GUI coordinates data 336.

If "NO" is determined in the step S15, that is, if no scroll operation is performed, the process returns to the step S11. If "YES" is determined in the step S15, that is, if the scroll operation is performed, the processor 30 renews the displaying of the notification information in a step S17, and then, the process returns to the step S11. For example, as shown in FIG. 8(A), the scroll operation moving the scroll bar B downwardly, the notification information being not displayed is read-out from the notification table data 338 to renew the notification information as shown in FIG. 8(B).

If the lock object Ob is touched, and "YES" is determined in the step S13, in a step S19, the processor 30 determines whether or not the touch position is within the notification area. More specifically, the coordinates range of the notification area 72 is read-out from the GUI coordinates data 336, and it is determined whether or not the touch coordinates indicating the current touch position stored in the touch buffer 330 is included in the coordinates range. If "NO" is determined in the step S19, that is, if the touch position is not included within the notification area 72, the process proceeds to a step S35.

If "YES" is determined in the step S19, if the current position is included within the notification area 72 displaying the notification information N3 as shown in FIG. 9(B), for example, the processor 30 starts a count or measurement of a time in a step S21. That is, the count or measurement of a time is started by the operation counter 344. Next, in a step S23, the processor 30 determines whether or not a predetermined time elapses. That is, it is determined whether or not the predetermined time is counted by the operation counter 344. If "NO" is determined in the step S23, that is, the predetermined time has not been measured by the operation counter 344, the processor 30 repeats the processing of the step S23.

If "YES" is determined in the step S23, that is, if the predetermined time elapses from a time that the touch position enters the notification area 72, the processor 30 displays, in a step S25, additional information in the notification area 72. If the touch position is included in the displaying domain of the notification information N3 as shown in FIG. 9(B), the additional information ("What would - - - ") corresponding to the notification information N3 is read from the notification table data 338, and the additional information is displayed instead of the notification information N3. The processor 30 executing the processing of the step S25 functions as the additional information displaying portion.

Subsequently, in a step S27, it is determined whether or not the touch position goes out of the notification area 72. That is, it is determined whether or not the touch coordinates showing the current touch position stored in the touch buffer 330 is not included in the coordinates range of the notification area 72 included in the GUI coordinates data 336. If "YES" is determined in the step S27, if the user's finger goes out of the notification area 72 by sliding, for example, the process returns to the step S19. In a case that the process returns to the step S19, the displaying of the additional information disappears and the notification information previously displayed is displayed.

If "NO" is determined in the step S27, that is, if the touch coordinates is not out of the notification area 72, in a step S29, the processor 30 determines whether or not the lock object Ob is released. That is, it is determined whether or not the lock object Ob is released in a state that the touch position is included in the notification area 72. The processor 30 executing the processing of the step S29 functions as a determining portion.

If "NO" is determined in the step S29, that is, if not released, the process returns to the step S27. On the other hand, if "YES" is determined in the step S 29, that is, if the lock object Ob is released within the displaying domain of the notification information N, in a step S31, the processor 30 turns the lock flag 342 off, and performs a function corresponding to the notification information N in a step S33. Then, if the processing of the step S33 is ended, the processor 30 terminates the lock controlling process. For example, as shown in FIG. 10(A) and FIG. 10(B), if the lock object Ob is released within the displaying domain of the notification information N3 notifying of a newly-arrived mail, the mail function is performed in the step S33, and the newly-arrived mail is displayed on the display 14. The processor 30 executing the processing of the steps S31 functions as a cancelling portion, and the processor 30 executing the processing of the step S33 functions as a performing portion.

In addition, if "NO" is determined in the step S19, that is, if the touch position is not included in the notification area 72 after the lock object Ob is touched, in a step S35, the processor 30 determines whether or not a cancelling operation is performed. For example, it is determined whether or not a touch operation of the flick that the lock object Ob is flicked out of the screen or a touch operation of the slide that the lock object Ob is moved by a distance equal to or more than the predetermined distance is performed.

If "NO" is determined in the step S35, if a portion that none is displayed is touched, for example, the process returns to the step S11 to display the lock screen again. In addition, if the moving distance of the lock object Ob is shorter than the predetermined distance or if the speed of the flick is slow, "NO" is determined in the step S35, and therefore, the lock screen is displayed again, and accordingly, the displaying position of the lock object Ob returns to its home position.

Furthermore, if "YES" is determined in the step S35, that is, if the cancelling operation of the lock state is performed, the processor 30 turns the lock flag 340 off in a step S37, and displays the standby screen in a step S39, and then, terminates the lock controlling process. That is, if the cancelling operation is performed, the lock state is canceled, and the function displaying area 62 of the display 14 becomes to display the standby screen as shown in FIG. 4(C).

In this embodiment shown, since the above-described processing are performed, the user can easily perform a desired function through a touch operation.

In addition, in the mobile phone 10 of this embodiment shown, other than the mail function, a short message service (SMS) function, a first blog function for performing an upload and reading of the message, and a second blog function that the number of the characters of the message is limited can be performed. Then, the mail function, the short message service function, the first blog function and the second blog function may be collectively called as "message function".

For example, in a case that a message is received by the short message service function, in the notification table, a reception time and a sender name of a newly-arrived message are recorded as the notification information, and as the additional information, a part of a text of the newly-arrived message is recorded. Furthermore, in the notification information N for the newly-arrived message displayed on the display 14, as similar to the notification information N3 of the newly-arrived mail, a reception time and a sender name are included. Then, if the touch position is included in a displaying domain of the notification information N after touching the lock object Ob, a part of the text of the newly-arrived message is displayed as the additional information, and if the touch is released from the lock object Ob, the lock state is canceled and a short message service function is performed such that the details of the newly-arrived message are displayed. Thus, in this embodiment shown, if the message is received by the mail function or the short message service function, it is possible to send a reply without cancelling the lock state. In addition, in other embodiments, the notification information N for the short message service function may include only either the reception time or the sender name.

Figure 14:
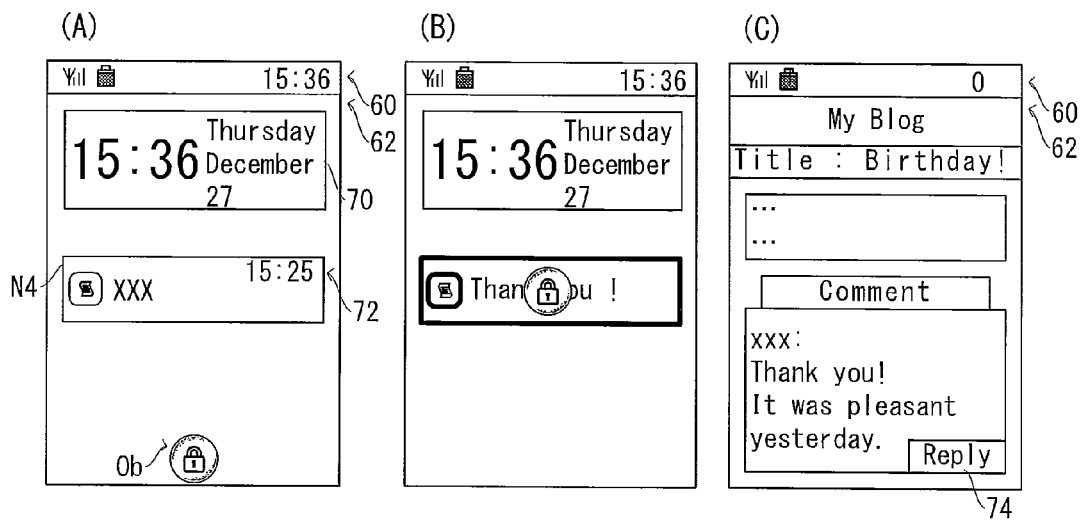

Furthermore, with referring to FIGS. 14(A)-14(C), if a notification that a newly-arrived comment is contributed against an uploaded article, in the notification table, a contribution time and a name of contributor of the newly-arrived comment against the uploaded article are recorded as the notification information, and as the additional information, a part of the newly-arrived comment is recorded. Furthermore, in the notification information N4 of the newly-arrived comment in the first blog function, the contribution time (15:25) and the contributor name (XXX) are included. Then, the touch position is moved within a displaying domain of the notification information N4 after the lock object Ob is touched, a part (Thank you!) of the newly-arrived comment is displayed, and if the touch is released from the lock object Ob, the lock state is canceled, and the first blog function is performed such that the newly-arrived comment becomes to be displayed. In addition, in other embodiments, in the notification information N for the first blog function only either one of the contribution time or the contributor name may be included.

Figure 15:
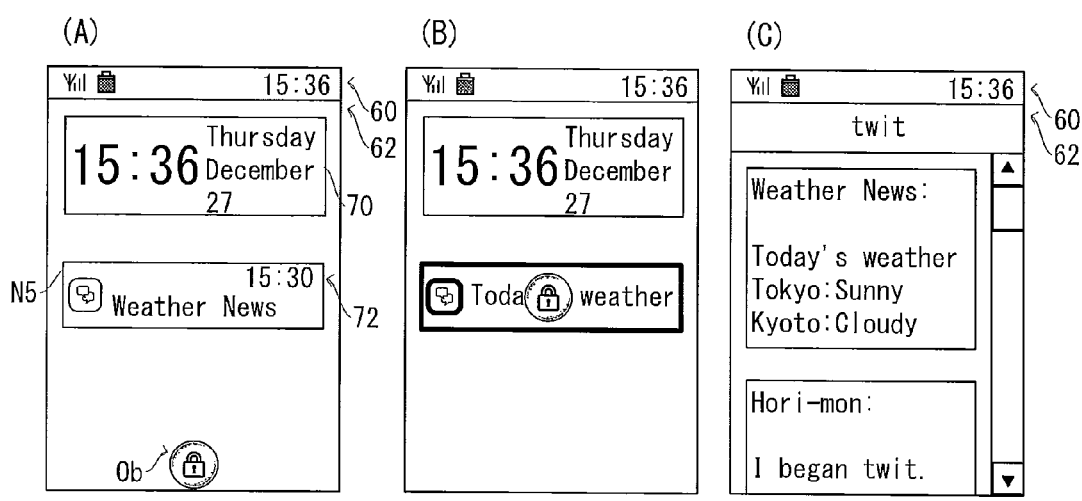

Furthermore, with referring to FIGS. 15(A)-15(C), if a notification that a comment is uploaded in the second blog function, in the notification table, a upload time and a name of an uploador of the comment are registered as the notification information, and as the additional information, a part of the comment is recorded. Furthermore, in the notification information N5 of the comment in the second blog function, the upload time (15:30) and the uploador name (Weather News) are included. Then, the lock object Ob is moved within a displaying domain of the notification information N5, a part (Today's weather) of the comment is displayed, and if the finger is released from the lock object Ob, the lock state is canceled, and the second blog function is performed such that the uploaded comment becomes to be displayed. In addition, in other embodiments, in the notification information N for the second blog function only either one of the upload time or the uploador name may be included.

Thus, according to the embodiment, the facility or convenience of the communication utilizing the first blog function or the second blog function can be increased. In addition, arbitrary notification information N for various kinds of functions can be displayed on the lock screen.

<Second Embodiment>

In the second embodiment, the notification information N displayed in the lock state is changed to secret displaying. In the following, the second embodiment will be described, but since except the above matter, the second embodiment is the same as or similar to the first embodiment, the duplicate description will be omitted. By changing the notification information N to the secret displaying, a security characteristic of the notification information N displayed in the lock screen can be increased.

Figure 16:
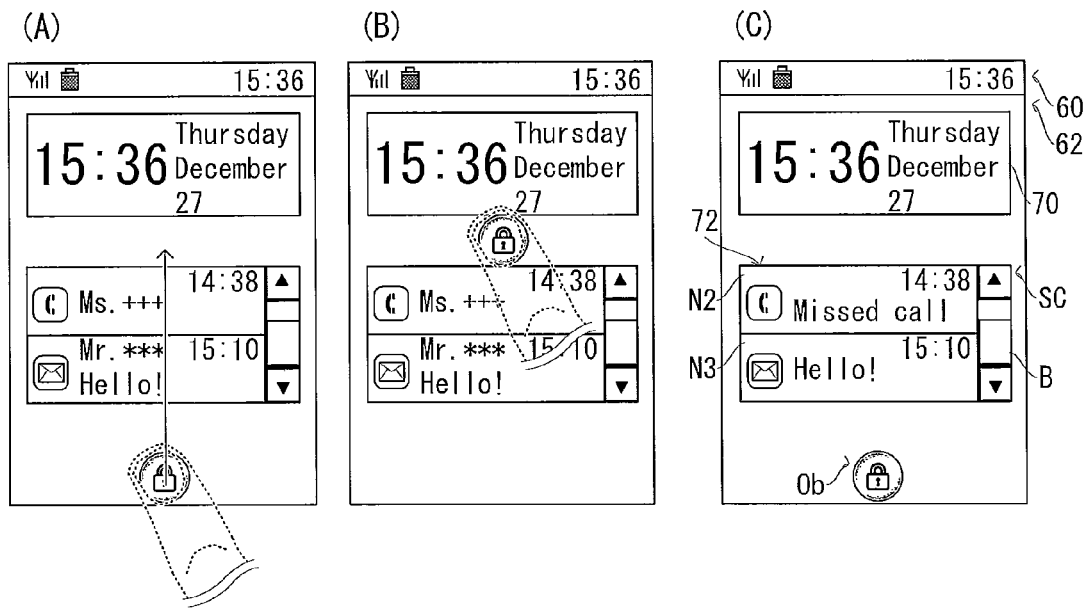

With referring to FIG. 16(A)-FIG. 16(C), after the lock object Ob is touched, if a touch operation that the touch position crosses the notification area 72 from a below to an above position, i.e., a secret operation is performed, a secret mode is set, and each of the notification information N is changed to the secret displaying. For example, if the notification information N2 for the unattended (missed) telephone call is changed to the secret displaying, instead of the name of a calling person, a character string ("Missed call", for example) indicating that a notification of the unattended (missed) telephone call is displayed. In addition, in a case of the notification information N3 for the newly-arrived mail, the sender name of the newly-arrived mail becomes not to be displayed.

In addition, in the secret mode, even if the touch position enters a displaying domain of the notification information N after the touching the lock object Ob, no additional information is displayed. Furthermore, even if the touch is released from the lock object Ob, the lock state is not canceled and the function corresponding to the notification information N is not performed.

In the secret mode, if the above-described secret operation is performed again, the secret mode is canceled. In addition, in other embodiments, even in the secret mode, if a normal cancelling operation is performed, the lock state may be canceled. Furthermore, three (3) or more notification information are recorded in the notification table, even in the secret mode, the scroll operation may be processed effectively.

Figure 17:
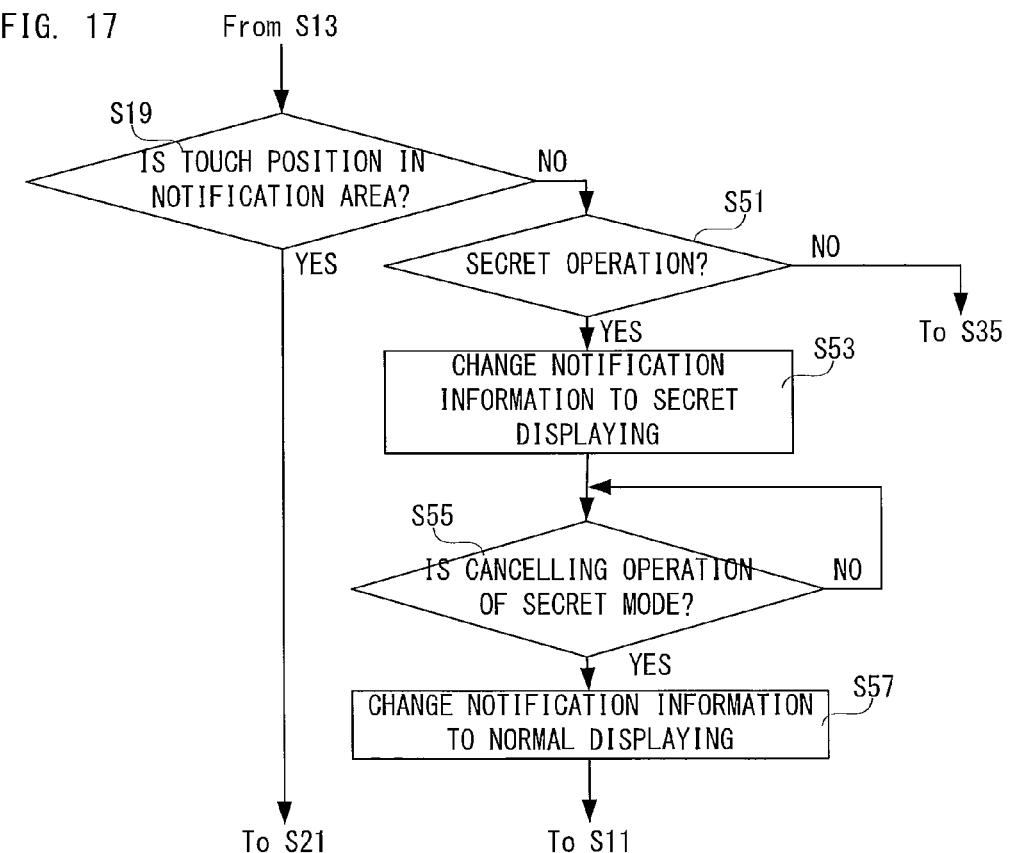
FIG. 17 is a flowchart showing one example of a part of a lock controlling process by the processor shown in FIG. 2 of a second embodiment.

FIG. 17 is a flowchart of a part of a lock controlling process of the second embodiment. In addition, in FIG. 17 flowchart, steps the same as those of the first embodiment are not shown.

If "NO" is determined in the step S19 of the lock controlling process, in a step S51, the processor 30 determines whether or not the secret operation is performed. That is, it is determined whether or not the secret operation as shown in FIG. 16(A) and FIG. 16(B) is performed. If "NO" is determined in the step S51, that is, if the secret operation is not performed, the process proceeds to the step S35. On the other hand, if "YES" is determined in the step S51, that is, if the secret operation is performed, the processor 30 changes the notification information to the secret displaying in a step S53. As shown in FIG. 16(C), a name of a calling person is not included in the notification information N, for example. Subsequently, in a step S55, it is determined whether or not the cancelling operation of the secret mode is performed. For example, it is determined whether or not the secret operation is performed again. If "NO" is determined in the step S 55, that is, if the cancelling operation of the secret mode is not performed, the processor 30 repeats the process of the step S55.

On the other hand, if "YES" is determined in the step S55, that is, if the cancelling operation of the secret mode is performed, the processor 30 changes the notification information to the normal displaying in a step S57, and then, the process returns to the step S11. For example, the notification information N2 and N3 displayed in the secret mode as shown in FIG. 16(C) returns to a state of FIG. 16(A).

<Third Embodiment>

In the third embodiment, a plurality of notification information N displayed in the lock screen are displayed while being classified by the category. In the following, the third embodiment will be described, but except the above matter, the third embodiment is the same as or similar to the first embodiment, and therefore, a duplicate description will be omitted here. By displaying a plurality of notification information N displayed with being classified by category, it is possible for the user to easily find necessary notification information N.

Figure 18:
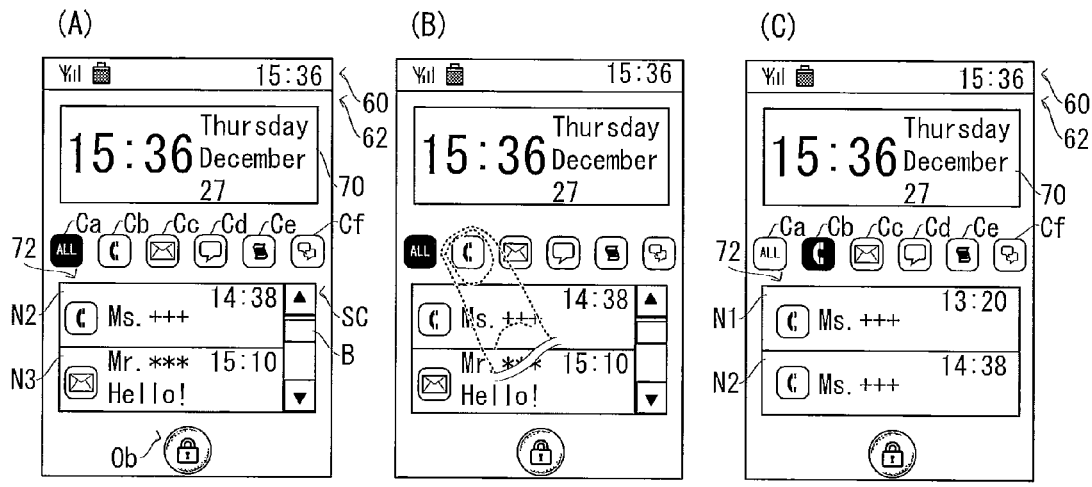

With referring to FIG. 18(A)-FIG. 18(C), in the lock screen of the third embodiment, a plurality of category icons C are displayed in addition to the date and time displaying 70 and the plurality of notification information N. The plurality of category icons C include an all category icon Ca, a telephone category icon Cb, a mail category icon Cc, a short message category icon Cd, a first blog category icon Ce and a second blog category Cf. A user can classify the plurality of notification information N into a category corresponding to an arbitrary category icon C by performing a touch operation to the arbitrary category icon C so as to display the notification information N.

In addition, since all the notification information N are displayed in an initial state, it is rendered a state that the all category icon Ca is selected.

For example, as shown in FIG. 18(B) and FIG. 18(C), if a touch operation is performed to the telephone category icon Cb, the notification information of the unattended telephone call and the automatic answering machine each corresponding to the telephone function are extracted from the notification table, and the notification information N1 and N2 are displayed in the notification area 72. Furthermore, if a touch operation to the telephone category icon Cb is performed, the displaying of the telephone category icon Cb is reversed. That is, it is possible to understand that a plurality of notification information is classified in correspondence to the telephone function.

Figure 19:
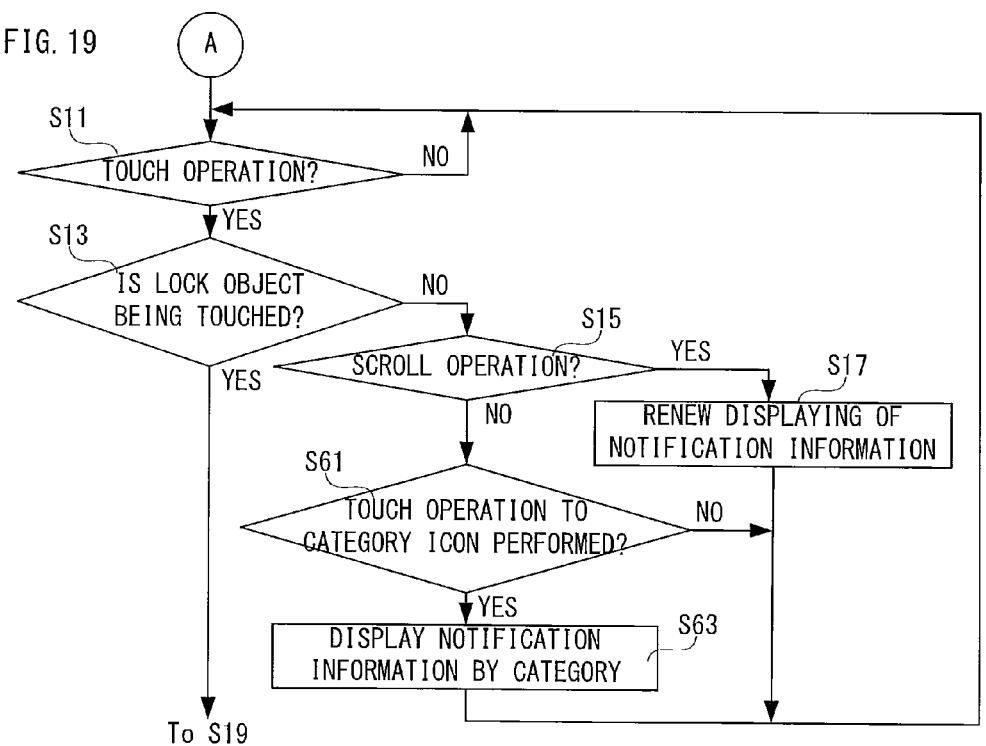
FIG. 19 is a flowchart showing one example of a part of a lock controlling process by the processor shown in FIG. 2 of a third embodiment.

FIG. 19 is a flowchart of a part of a lock controlling process according to the third embodiment. In addition, in FIG. 19 flowchart, steps the same as or similar to those of the first embodiment are not shown.

If "NO" is determined in the step S15 of the lock controlling process, that is, if a scroll operation is not performed, in a step S61, the processor 30 determines whether or not a touch operation to any one of the category icons C. For example, it is determined whether or not a touch operation to the category icon C is performed as shown in FIG. 18(B). If "NO" is determined in the step S61, that is, if the touch operation to the category icon C is not performed, the returns proceeds to the step S11. If "YES" is determined in the step S 61, if a touch operation to the telephone category icon Cb is performed, for example, in a step S63, the processor 30 displays the notification information N classified by category, and then the process returns to the step S11. That is, in a case that the touch operation is performed to the telephone category icon Cb, the notification information of the unattended (missed) telephone call and the automatic answering machine are extracted from the notification table, and the extracted notification information are displayed in the notification area 72.

In addition, in the third embodiment, after touching the lock object Ob, if the category icon C corresponding to the function is selected by the lock object Ob and then the touch operation to the lock object Ob is released, the lock state may be canceled and the function corresponding to the selected category icon C may be performed.

<Fourth Embodiment>

In the fourth embodiment, instead of the notification information N displayed in the notification area 72, as the notification information, a task icon Ta is displayed on the display 14. In the following, the fourth embodiment will be described, except the above-described matter, the fourth embodiment is the same as or similar to the first embodiment, and therefore, a duplicate description will be omitted here.

With referring to FIG. 20(A), a task icon Ta of a mail function is displayed on the display 14. The task icon Ta is displayed in the status displaying area 60 if and when a newly-arrived mail is received by the mobile phone 10, for example. Then, with referring to FIG. 20(B) and FIG. 20(C), if a touch operation to the lock object Ob is performed by the user in a state that the lock state is set, and after the task icon Ta of the mail function is selected by the lock object Ob, the finger is released from the lock object Ob, a list of received mails including the newly-arrived mail is displayed in the function displaying area 62. Thus, it is possible for the user to cancel the lock state and to perform the function related to the task icon Ta by utilizing the task icon Ta that is utilized in a conventional mobile phone.

Furthermore, as shown in FIG. 20(B), if the task icon Ta is selected by the lock object Ob, the displaying of the task icon Ta is enlarged in order to make clear that the task icon Ta is being selected.

Furthermore, in other embodiments, a task icon Ta showing an unattended telephone call of the telephone function may be displayed in the status displaying area 60. For example, if the above-described operation is performed against the task icon Ta corresponding to the unattended telephone call of the telephone function and the telephone function is performed, an incoming call log including the unattended telephone call is displayed on the function displaying area 62.

In addition, the first embodiment to the fourth embodiment can be arbitrarily combined with each other, and specific combinations will be easily assumed, and therefore, detailed descriptions thereof are omitted here.

Figure 21:
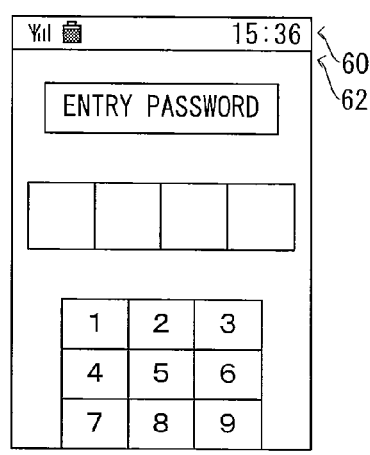
FIG. 21 is an illustrative view showing one example of a security screen displayed on the display shown in FIG. 1.

Furthermore, in other embodiments, a security setting may be employed such that if the cancel operation of the lock state is performed, a security screen requesting entry of a password may be utilized. For example, if the cancel operation is made to the lock object Ob, on the display 14, a security screen shown in FIG. 21 is displayed. Then, if the correct password is input on the security screen, the standby screen shown in FIG. 4(C) is displayed, but if the erroneous password is input, re-input of the password is required.

Figure 22:
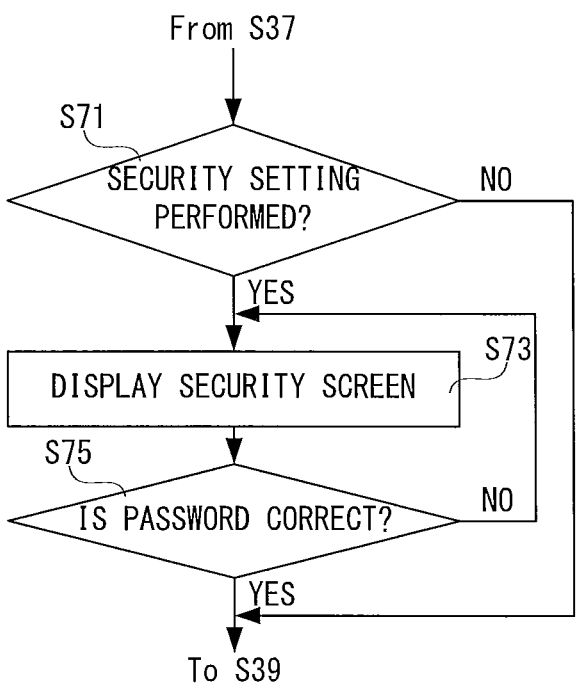
FIG. 22 is a flowchart showing one example of a part of a lock controlling process by the processor shown in FIG. 2 of the other embodiment.

With referring to FIG. 22, in a case that the security setting is made, the lock flag 342 is turned-off in the step S37 of the lock controlling process, in a step S71, the processor 30 determines whether or not the security setting is made. That is, it is determined whether or not a flag corresponding to the security setting is turned-on. If "NO" is determined in the step S71, that is, if the security setting is not performed, the process proceeds to the step S39 to display the standby screen. On the other hand, if "YES" is determined in the step S71, that is, if the security setting is utilized, the processor 30 displays the security screen in a step S73, and determines whether or not the password is correct in a step S75. That is, the security screen shown in FIG. 21 is displayed on the display 14, and it is determined whether or not the password input in the security screen is correct. If "NO" is determined in the step S75, that is, if the input password is in error, the process returns the step S73. On the other hand, if "YES" is determined in the step S75, that is, if the input password is correct, the processor 30 displays the standby screen in the step S39. Then, in a case that the security setting is performed, even after the lock object Ob is released in a state that the lock object Ob is included in the displaying domain of the notification information N, the above-described security screen is displayed. Therefore, in the lock controlling process of other embodiments, steps similar to the steps S71-S75 are inserted between the step S31 and the step S33.

Figure 20:
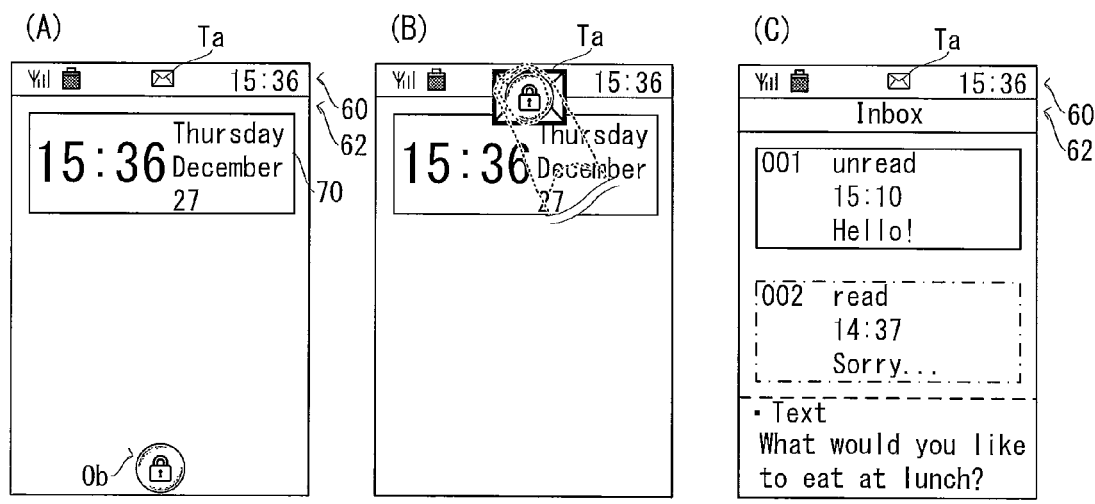

In other embodiments, the lock state may be canceled and the application related to the notification information N may be performed by a touch operation not using the lock object Ob (a predetermined touch operation). For example, in such embodiments, if a drug and drop operation (an operation that a finger of the user is slid into the lock screen and then released in the lock screen after touching a part of the status displaying area 60) in a state that the task icon Ta is being displayed in the status displaying area 60 as shown in FIG. 20, a displaying of the display 14 is changed from the lock screen to the notification information screen while the lock state is maintained. The notification information N corresponding to the task icon Ta is displayed in the notification information screen, if and when the user performs a touch operation to an arbitrary notification information N, the lock state is canceled and a function related to the notification information N is performed. In this case, a drug and drop operation in the lock screen and a touch operation in the notification information screen are included in the above-described "predetermined touch operation".

In addition, in the lock controlling process in such embodiments, the processor 30 determines whether or not the drug and drop operation is performed in the status displaying area 60 in the step S3. If "YES" is determined, the notification information screen is displayed in the step S5. Then, instead the processing in the steps S11-S29, an additional step determining whether or not the touch operation is made to the notification information N is performed. If "YES" is determined in the additional step, the steps S31 and S33 are performed, and therefore, the lock state is canceled and the function corresponding to the touched notification information N is performed. However, by displaying a dedicated key for cancel the lock state in the notification information screen, the steps S35-S39 may be performed after "NO" is determined in the additional step, the step S35 determining whether or not the dedicated key is operated.

Furthermore, in other embodiments, the notification information N may be displayed when the user operates the mobile phone 10. For example, if an operation of turning-on the power to the display 14 is made, even if the notification information is recorded in the notification table, the notification information N is not displayed on the display 14 at this time. Then, if the user operates the menu key 26, the notification information recorded in the notification table is displayed on the display 14.

In order to make the displaying contents of the notification information N not be hidden by the lock object Ob, the lock object Ob that is moved within the displaying domain of the notification information N may be reduced in its size. If the lock object Ob is moved within the displaying domain of the notification information N, the displaying of the notification information N may be enlarged.

Furthermore, if a telephone call occurs at a time that the touch operation is being performed against the lock object Ob, the displaying of the lock object Ob is erased, and a telephone call responding screen is displayed. In the telephone call responding screen, a responding object for cancelling the lock state and for responding to the telephone calling is included. Then, if an operation similar to the cancel operation against the lock object Ob is performed to the telephone call responding object, the telephone conversation starts.

Furthermore, a function that the notification information thereof is to be recorded may include a music player function. For example, notification information of the music player function includes a name and reproduction time of a piece of music being reproduced in the lock state, and the additional information may include artist information, jacket image, etc.

In other embodiments, a function corresponding to SNS (Social Network Service) such as Facebook (registered trademark), Mixi (registered trademark) or the like may be included in a function that notification information thereof is to be recorded. In such a case, as the notification information of the above-described function, the notification information N corresponding to the above-described first blog function or the second blog function is displayed in the lock screen.

Programs utilized in the above-described embodiments may be stored in a HDD of the server for data distribution, and distributed to the mobile phone 10 via the network. The plurality of programs may be stored in a storage medium such as an optical disk of CD, DVD, BD (Blu-ray Disc) or the like, a USB memory, a memory card, etc. and then, such the storage medium may be sold or distributed. In a case that the plurality of programs downloaded via the above-described server or storage medium are installed to a mobile phone having the structure equal to the structure of the embodiment, it is possible to obtain advantages equal to advantages according to the embodiment.

The specific numerical values mentioned in this specification are only examples, and changeable properly in accordance with the change of product specifications.

An embodiment is a mobile terminal having a display portion, a touch panel provided on the display portion and a detecting portion which detects a touch operation to the touch panel, and capable of being set with a lock state restricting execution of predetermined processing based on a touch operation, comprising: a storing portion which stores notification information related to a predetermined function; a displaying processing portion which displays in a displaying area of the display portion, when the lock state is set, an object which accepts a touch operation for cancelling the lock state and moves in response to the touch operation, and the notification information; a determining portion which determines whether or not a touch operation that moves the object to a displaying domain where the notification information is being displayed, and then is released from the object is detected; a cancelling portion which cancels the lock state when it is determined that said touch operation is detected; and a performing portion which performs a function related to the notification information when it is determined that said touch operation is detected.

In the embodiment, a mobile terminal (10: a reference numeral exemplifying a corresponding portion in the embodiment, and so forth) has a touch panel (16) provided on a display portion (14) and a detecting portion (48) which detects a touch operation. Furthermore, if a lock state is set, an object (Ob) which accepts a touch operation for cancelling the lock state and moves in response to the touch operation is displayed on the display portion, and predetermined processing based on a touch operation becomes not to be performed. A storing portion (46) stores notification information for notifying a newly-arrived mail received by a mail function, for example. A displaying processing portion (30, S5) displays notification information (N, Ta) of the above-described mail function, for example, if and when a power for the display portion is turned-on at a time that the lock state is being set. A determining portion (30, S29) determines whether or not a touch operation moving the object to a displaying domain where the notification information being displayed, and being released from the object after touching the displaying of the object is detected. Then, a cancelling portion (30, S31) cancels the lock state and a performing portion (30, S33) performs a function related to the notification information being displayed in the displaying domain if and when it is determined that such a touch operation is performed.

According to the embodiment, it is possible for the user to cancel the lock state as necessary and to perform a function related to notification information when he/she confirms the notification information displayed in the lock screen.

Another embodiment is a mobile terminal further comprising an additional information displaying portion which displays additional information corresponding to the notification information when the object is moved to the displaying domain displaying the notification information.

In this embodiment, the additional information displaying portion (30, S25) displays at least a part of a text or body of a newly-arrived mail as the additional information in a case that the notification information notifies the newly-arrived mail.

According to the embodiment, the user can determine whether or not the lock state is to be canceled and the function corresponding to the notification information is to be performed after he/she confirms the details of the notification information on the basis of the additional information.

A further embodiment is a mobile terminal wherein the predetermined function includes a message function that transmission/reception or reading of a message is performed, and notification information corresponding to the message function includes at least one of a time that the message is received by the message function and a name of a sender, and the additional information of the notification information corresponding to the message function includes at least a part of a text of the message, and the performing portion performs the message function such that details of the message are displayed on the display portion.

In the further embodiment, the message function includes a function for transmitting/receiving or reading a message such as a mail, an article for contribution, etc. For example, if the message is received, a time that the message is received is stored as notification information corresponding to the message function. A part of the received message is stored as additional information of the notification information. Then, the performing portion performs the message function such that details of the received message can be displayed.

A still further embodiment is a mobile terminal wherein the message function includes a mail function, and notification information corresponding to the mail function includes at least one of a time that a newly-arrived mail is received and a name of a sender, and the additional information of the notification information corresponding to the mail function includes at least a part of a text of the mail, and the performing portion performs the mail function such that the newly-arrived mail is displayed in a manner that a reply to the newly-arrived mail can be sent.

Another embodiment is a mobile terminal wherein the message function includes a short message service function, and notification information corresponding to the short message service function includes at least one of a time that a newly-arrived message is received and a name of a sender, and the additional information of the notification information corresponding to the short message service function includes at least a part of a text of the newly-arrived message, and the performing portion performs the short message service function such that the newly-arrived message is displayed in a manner that a reply to the newly-arrived message can be sent.

According to these embodiments, if the message is received by the mail function or the short message service function, it is possible to send a reply to the newly-arrived mail or message while the lock state is not needed to be canceled.

Another further embodiment is a mobile terminal wherein the message function includes a blog function, and notification information corresponding to the blog function includes at least one of a time that a newly-arrived comment against an article uploaded by the blog function is contributed and a name of a contributor, and the additional information of the notification information corresponding to the blog function includes at least a part of the newly-arrived comment, and the performing portion performs the blog function such that the newly-arrived comment is displayed.

According to this embodiment, it is possible to increase facility or convenience of the communication utilizing the blog function.

A still another further embodiment is a mobile terminal wherein the predetermined function includes a telephone function, and notification information corresponding to the telephone function includes arrival information of an unattended call, and the additional information of the notification information corresponding to the telephone function includes a telephone number of the unattended call, and the performing portion performs the telephone function in a state capable of sending a call.

According to the embodiment, it becomes possible to reply to the unattended call by omitting an operation for cancelling the lock state.

A still further embodiment is a lock controlling method of a mobile terminal (10) having a display portion (14), a touch panel (16) provided on the display portion, a detecting portion (48) which detects a touch operation to the touch panel, and a storing portion (46) which stores notification information related to a predetermined function, and capable of being set with a lock state restricting execution of predetermined processing based on a touch operation, comprising steps of: displaying (S5) in a displaying area of the display portion, when the lock state is set, an object (Ob) which accepts a touch operation for cancelling the lock state and moves in response to the touch operation, and the notification information (N, Ta); determining (S29) whether or not a touch operation that moves the object to a displaying domain where the notification information is being displayed, and then is released from the object is detected; cancelling (S31) the lock state when it is determined that said touch operation is detected; and performing (S33) a function related to the notification information when it is determined that said touch operation is detected.

According to the still further embodiment, it is possible for the user to cancel a lock state as necessary and to perform a function related to the notification information when he/she confirms the notification information displayed in the lock screen.

The other embodiment is a mobile terminal having a display portion, a touch panel provided on the display portion and a detecting portion which detects a touch operation to the touch panel, and capable of being set with a lock state restricting execution of predetermined processing, comprising: a storing portion which stores notification information related to a predetermined function; a displaying processing portion which displays the notification information in a displaying area of the display portion when the lock state is set; a determining portion which determines whether or not a predetermined touch operation to a displaying domain where the notification information is being displayed; a cancelling portion which cancels the lock state when it is determined that said predetermined touch operation is detected; and a performing portion which performs a function related to the notification information when it is determined that said predetermined touch operation is detected.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A mobile terminal having a display portion, a touch panel provided on the display portion, and a detecting portion which detects a touch operation to the touch panel, and wherein the mobile terminal is capable of being set with a lock state restricting execution of predetermined processing based on a touch operation, the mobile terminal comprising:
   a storing portion which stores initial information and additional information for each of a plurality of notifications, wherein each of the plurality of notifications is related to one of a plurality of predetermined functions;
   a display processing portion which, when the lock state is set,
      displays, in a first display area of the display portion, each of the plurality of notifications, wherein each of the plurality of displayed notifications comprises the initial information for the notification but not the additional information for the notification, and
      displays, in a second display area of the display portion, an object which moves in response to a touch operation;
   a determining portion which detects a touch operation for displaying additional information and a touch operation for cancelling the lock state, wherein the touch operation for displaying additional information comprises moving the object over one of the plurality of displayed notifications, and wherein the touch operation for cancelling the lock state comprises moving and releasing the object over one of the plurality of displayed notifications;
   a cancelling portion which, in response to a detection of the touch operation for cancelling the lock state, cancels the lock state; and
   a performing portion which, in response to a detection of the touch operation for cancelling the lock state, performs the predetermined function related to the one of the plurality of displayed notifications over which the object was released.

2. A mobile terminal according to claim 1, wherein the plurality of notifications comprise a message notification, wherein the message notification is related to a predetermined function comprising a message function by which transmission/reception or reading of a message is performed, wherein the initial information for the message notification comprises at least one of a time that the message is received by the message function and a name of a sender, wherein the additional information for the message notification comprises at least a part of a text of the message, and wherein the performing portion performs the message function such that details of the message are displayed on the display portion.

3. A mobile terminal according to claim 2, wherein the message function includes a mail function, wherein the initial information for the message notification comprises at least one of a time that a newly-arrived mail is received and a name of a sender, wherein the additional information for the message notification comprises at least a part of a text of the newly-arrived mail, and wherein the performing portion performs the mail function such that the newly-arrived mail is displayed in a manner that a reply to the newly-arrived mail can be initiated.

4. A mobile terminal according to claim 2, wherein the message function includes a short message service function, wherein the initial information for the message notification comprises at least one of a time that a newly-arrived message is received and a name of a sender, wherein the additional information for the message notification comprises at least a part of a text of the newly-arrived message, and wherein the performing portion performs the short message service function such that the newly-arrived message is displayed in a manner that a reply to the newly-arrived message can be initiated.

5. A mobile terminal according to claim 2, wherein the message function includes a blog function, wherein the initial information for the message notification comprises at least one of a time that a newly-arrived comment against an article uploaded by the blog function is contributed and a name of a contributor, wherein the additional information for the message notification comprises at least a part of the newly-arrived comment, and wherein the performing portion performs the blog function such that the newly-arrived comment is displayed.

6. A mobile terminal according to claim 1, wherein the plurality of notifications comprise a telephone notification, wherein the telephone notification is related to a predetermined function comprising a telephone function, wherein the initial information for the message notification comprises arrival information of an unattended call, wherein the additional information for the telephone notification comprises a telephone number of the unattended call, and wherein the performing portion performs the telephone function in a state capable of initiating a call.

7. A lock controlling method of a mobile terminal having a display portion, a touch panel provided on the display portion, a detecting portion which detects a touch operation to the touch panel, and a storing portion which stores initial information and additional information for each of a plurality of notifications, wherein each of the plurality of notifications is related to one of a plurality of predetermined functions, and wherein the mobile terminal is capable of being set with a lock state restricting execution of predetermined processing based on a touch operation, the method comprising:
 when the lock state is set,
  displaying, in a first display area of the display portion, each of the plurality of notifications, wherein each of the plurality of displayed notifications comprises the initial information for the notification but not the additional information for the notification, and
  displaying, in a second display area of the display portion, an object which moves in response to a touch operation;
 determining whether or not a touch operation for displaying additional information is detected and whether or not a touch operation for cancelling the lock state is detected, wherein the touch operation for displaying additional information comprises moving the object over one of the plurality of displayed notifications, and wherein the touch operation for cancelling the lock state comprises moving and releasing the object over one of the plurality of displayed notifications; and,
 in response to a determination that the touch operation for cancelling the lock state is detected,
  cancelling the lock state, and
  performing the predetermined function related to the one of the plurality of displayed notifications over which the object was released.

8. A mobile terminal having a display portion, a touch panel provided on the display portion and a detecting portion which detects a touch operation to the touch panel, and wherein the mobile terminal is capable of being set with a lock state restricting execution of predetermined processing, the mobile terminal comprising:
 a storing portion which stores initial information and additional information for each of a plurality of notifications, wherein each of the plurality of notifications is related to one of a plurality of predetermined functions;
 a display processing portion which displays each of the plurality of notifications in a display area of the display portion when the lock state is set, wherein each of the plurality of displayed notifications comprises the initial information for the notification but not the additional information for the notification, and
 displays an object which moves in response to a touch operation;
 a determining portion which detects a predetermined touch operation for displaying additional information and a predetermined touch operation for cancelling the lock state, wherein the predetermined touch operation for displaying additional information comprises moving the object over one of the plurality of displayed notifications, and wherein the predetermined touch operation for cancelling the lock state comprises moving and releasing the object over one of the plurality of displayed notifications;
 a cancelling portion which, in response to a detection of the touch operation for cancelling the lock state, cancels the lock state; and
 a performing portion which, in response to a detection of the touch operation for cancelling the lock state, performs the predetermined function related to the one of the plurality of displayed notifications over which the object was released.

\* \* \* \* \*